US008071045B2

(12) United States Patent
Miyazaki

(10) Patent No.: US 8,071,045 B2
(45) Date of Patent: Dec. 6, 2011

(54) REFORMER

(75) Inventor: Tomio Miyazaki, Hadano (JP)

(73) Assignee: Honda Motor Co., Ltd., Tokyo (JP)

( * ) Notice: Subject to any disclaimer, the term of this patent is extended or adjusted under 35 U.S.C. 154(b) by 1047 days.

(21) Appl. No.: 11/919,613

(22) PCT Filed: May 23, 2006

(86) PCT No.: PCT/JP2006/310613
§ 371 (c)(1),
(2), (4) Date: Oct. 30, 2007

(87) PCT Pub. No.: WO2006/126702
PCT Pub. Date: Nov. 30, 2006

(65) Prior Publication Data
US 2008/0254327 A1 Oct. 16, 2008

(30) Foreign Application Priority Data

May 23, 2005 (JP) .................................. 2005-149237

(51) Int. Cl.
*B01J 8/04* (2006.01)
(52) U.S. Cl. ........ 422/188; 422/187; 422/189; 422/190; 422/195; 422/211; 48/61; 423/650; 423/648.1; 423/651; 429/19; 429/20; 60/780
(58) Field of Classification Search ........... 422/187–190
See application file for complete search history.

(56) References Cited

U.S. PATENT DOCUMENTS

| 6,120,926 | A | 9/2000 | Szydlowski et al. |
| 6,896,709 | B1 * | 5/2005 | Han et al. ..................... 48/127.9 |
| 2002/0042035 | A1 | 4/2002 | Komiya et al. |
| 2005/0048333 | A1 | 3/2005 | Pettit |

FOREIGN PATENT DOCUMENTS

| EP | 0 989 621 A2 | 3/2000 |
| EP | 1 300 190 A1 | 4/2003 |
| JP | 05-129026 | 5/1993 |
| JP | 2001-019403 | 1/2001 |
| JP | 2001-106507 | 4/2001 |
| JP | 2001-146401 | 5/2001 |
| JP | 2002-531363 | 9/2002 |
| WO | WO-2004/045761 A1 | 6/2004 |

* cited by examiner

*Primary Examiner* — Kaity V. Handal
(74) *Attorney, Agent, or Firm* — Nelson Mullins Riley & Scarborough LLP; Anthony A. Laurentano

(57) ABSTRACT

A reformer includes first and second reforming units which are stacked together. A first hole is formed at the center of a first receiver member of the first reforming unit, and a plurality of holes are formed in a peripheral portion of a second receiver member of the second reforming unit. In the structure, a reforming channel having a serpentine pattern going through the first and second holes is formed. In each of the first and second receiver members, a single layer of catalyst pellets is provided. Both end surfaces of the catalyst pellets substantially contact the first and second receiver members.

7 Claims, 13 Drawing Sheets

--→ FUEL GAS
—→ OXYGEN-CONTAINING GAS

---→ RAW FUEL (REFORMED GAS)

→ RAW FUEL (REFORMED GAS)

--- RAW FUEL (REFORMED GAS)

---→ RAW FUEL (REFORMED GAS)

REFORMER

Related Applications

This application is a 35 U.S.C. 371 national stage filing of International Application No. PCT/JP2006/310613, filed 23 May 2006, which claims priority to Japan Patent Application No. 2005-149237 filed on 23 May 2005 in Japan. The contents of the aforementioned applications are hereby incorporated by reference.

TECHNICAL FIELD

The present invention relates to a reformer for reforming a raw fuel chiefly containing hydrocarbon to produce a reformed gas.

BACKGROUND ART

For example, a solid oxide fuel cell (SOFC) employs an electrolyte of ion-conductive oxide such as stabilized zirconia. The electrolyte is interposed between an anode and a cathode to form an electrolyte electrode assembly (unit cell). The electrolyte electrode assembly is interposed between separators (bipolar plates). In use, predetermined numbers of the unit cells and the separators are stacked together to form a fuel cell stack.

Normally, as a fuel gas supplied to the fuel cell, a hydrogen gas produced from a hydrocarbon based raw fuel by a reformer is used. In the reformer, after a reforming raw material gas is obtained from the hydrocarbon based raw fuel such as a fossil fuel, e.g., methane or LNG, the reforming raw material gas is subjected to steam reforming or partial oxidation reforming, autothermal reforming or the like to produce a reformed gas (fuel gas).

For example, Japanese Laid-Open Patent Publication No. 2001-106507 discloses a reformer as shown in FIG. 13. The reformer includes a cylindrical container 1. Lid plates 2 are fixed to the opposite ends of the cylindrical container 1 in the axial direction. In the cylindrical container 1, a catalyst layer 3 filled with catalyst is supported by punching plates 4, 4a. In the catalyst layer 3, baffle plates 6 and 7 are provided alternately. The baffle plate 6 has an opening at a lower position, and the baffle plate 7 has an opening at an upper position. Cushion material 8 is provided above the catalyst layer 3.

In the catalyst layer 3, a gas flows through the openings of the baffle plates 6, 7 vertically in a zigzag pattern. According to the disclosure, in the structure, it is possible to prevent formation of short paths for the gas flowing in the catalyst layer 3.

In the conventional technique, normally, a large number of pieces of catalyst in the form of particles are filled in the catalyst layer 3 to ensure that the surface area of contact between the catalyst particles and the gas is large. However, the catalyst particles move easily in the catalyst layer 3 when the gas pressure or the like is applied to the catalyst layer 3. Under the circumstances, short paths may be formed in the catalyst layer 3 undesirably. As a result, in the catalyst layer 3, the desired surface area of the catalyst particles that contact the gas cannot be maintained. Accordingly, the reforming efficiency is lowered.

DISCLOSURE OF INVENTION

A main object of the present invention is to provide a reformer having a compact structure in which it is possible to effectively increase the surface area of catalyst which contacts a raw fuel, and increase the reforming efficiency.

The present invention relates to a reformer for reforming a raw fuel chiefly containing hydrocarbon to produce a reformed gas. The reformer comprises a plurality of reforming units which are stacked together. A raw fuel channel is provided in the reforming units for allowing the raw fuel to flow in a serpentine pattern in a stacking direction of the reforming units. A single layer of reforming catalysts is provided in each of the reforming units, and the reforming catalysts are supported between an end of one of adjacent reforming units and an end of the other of the adjacent reforming units in the stacking direction.

Preferably, the one of the adjacent reforming units has a first receiver member, and the first receiver member has a first hole formed at substantially the center of the first receiver member. The other of the adjacent reforming units has a second receiver member, and the second receiver member has a plurality of second holes formed in a peripheral portion of the second receiver member. The raw fuel channel goes through the first hole and the second holes alternately to have a serpentine pattern.

Further, preferably, the reforming catalyst has a columnar shape, and both end surfaces of each of the reforming catalysts substantially contact a wall surface of the first receiver member and a wall surface of the second receiver member. The expression "substantially contact" herein includes, e.g., the state in which the catalysts are supported between the first and second receiver members by the surface-to-surface contact or the point-to-point contact, and the state in which the catalysts are slightly spaced from the first or second receiver member due to the difference in the coefficient of thermal expansion or the like.

Furthermore, preferably, the reforming units are symmetrical with respect to the central axis of the reforming units, and the reforming catalysts are provided substantially symmetrically with respect to the central axis of the reforming units. Further, preferably, protrusions for positioning the reforming catalysts in the single layer are provided in the reforming units.

BEST MODE FOR CARRYING OUT THE INVENTION

Figure 1:
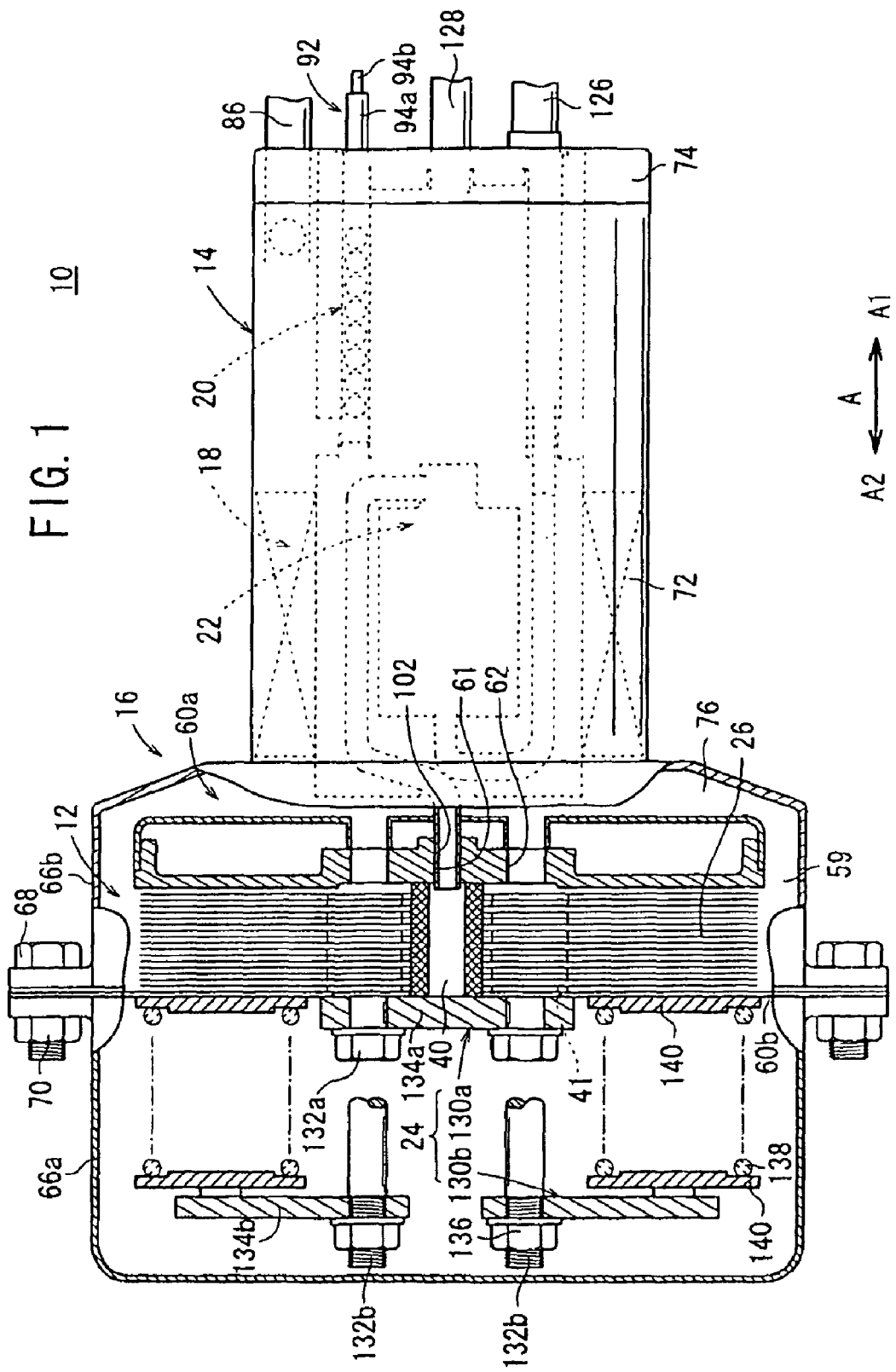
FIG. 1 is a partial cross sectional view showing a fuel cell system including a reformer according to a first embodiment of the present invention.

A fuel cell system 10 is used in various applications, including stationary and mobile applications. For example, the fuel cell system 10 is mounted on a vehicle. As shown in FIG. 1, the fuel cell system 10 includes a fuel cell stack 12, a fluid unit 14 provided on one side of the fuel cell stack 12, and a casing 16 containing the fuel cell stack 12 and the fluid unit 14.

Figure 2:
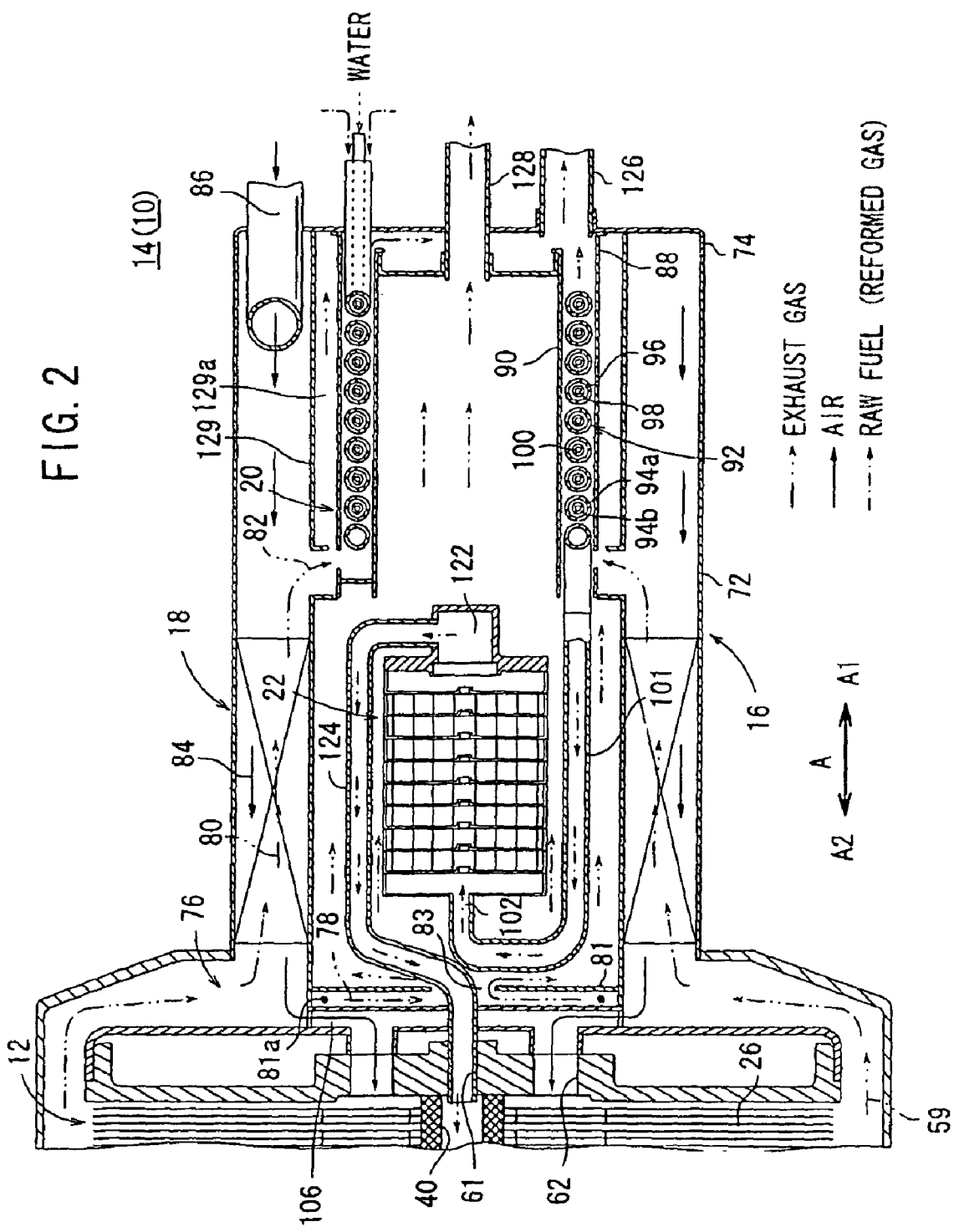
FIG. 2 is a cross sectional view showing main components of the fuel cell system.

As shown in FIGS. 1 and 2, the fluid unit 14 includes a heat exchanger 18 for heating an oxygen-containing gas before it is supplied to the fuel cell stack 12, an evaporator 20 for evaporating water to produce a mixed fuel of raw fuel chiefly containing hydrocarbon (e.g., the city gas) and the water vapor, and a reformer 22 for reforming the mixed fuel to produce a reformed gas.

The reformer 22 is a preliminary reformer for producing a raw fuel gas chiefly containing methane ($CH_4$) using hydrocarbon of high carbon ($C_{2+}$) such as ethane ($C_2H_6$), propane ($C_3H_6$), and butane ($C_4H_{10}$) in the city gas by steam reforming. The operating temperature of the reformer 22 is in the range of 200° C. to 500° C., more preferably, 300° C. to 400° C.

Figure 3:
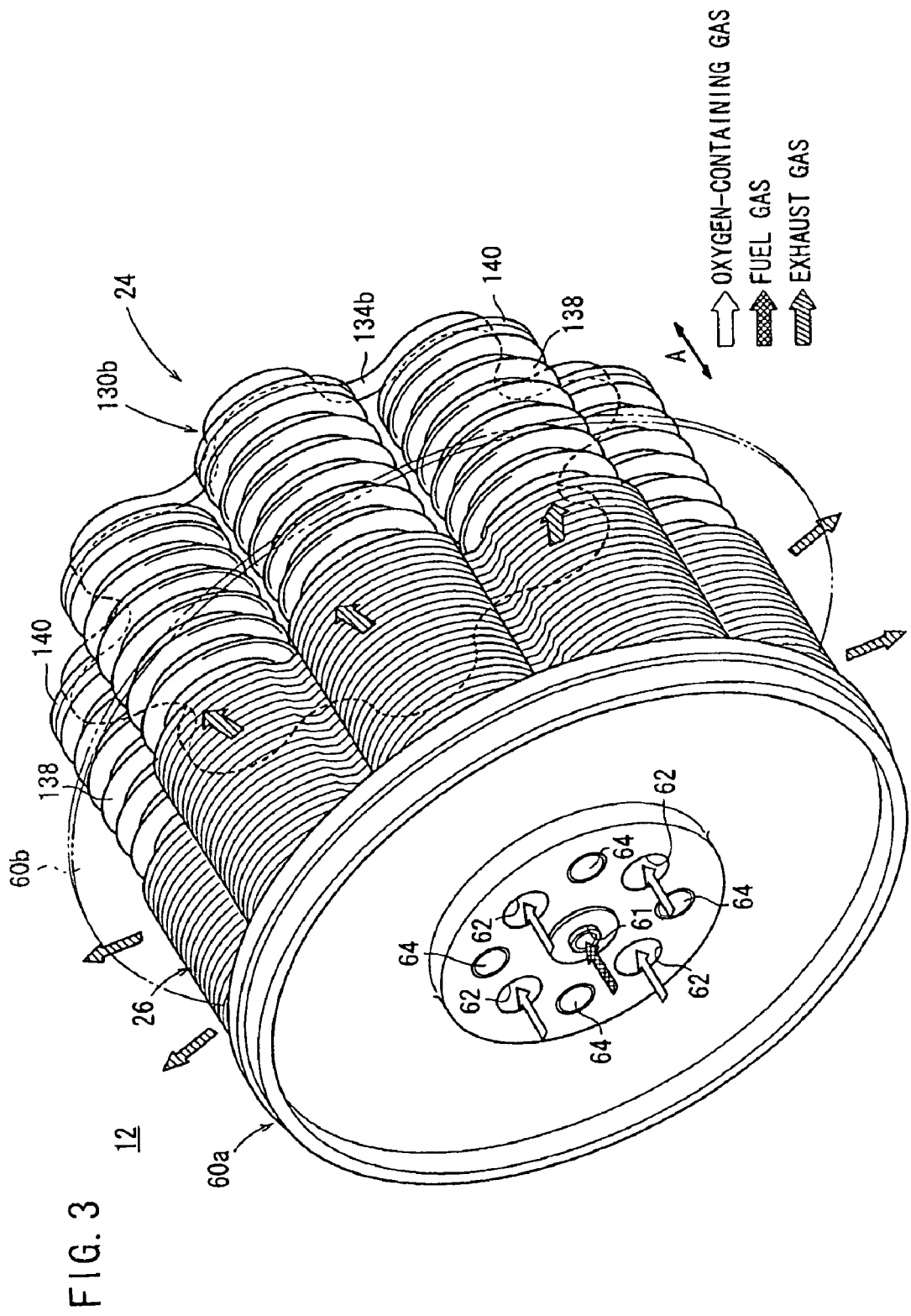
FIG. 3 is a perspective view schematically showing a fuel cell stack of the fuel cell system.

In the casing 16, a load applying mechanism 24 is provided on the other side of the fuel cell stack 12 for applying a tightening load in a stacking direction of the fuel cells 26 of the fuel cell stack 12 indicated by an arrow A (see FIGS. 1 and 3). The fluid unit 14 and the load applying mechanism 24 are provided symmetrically with respect to the central axis of the fuel cell stack 12.

Figure 4:
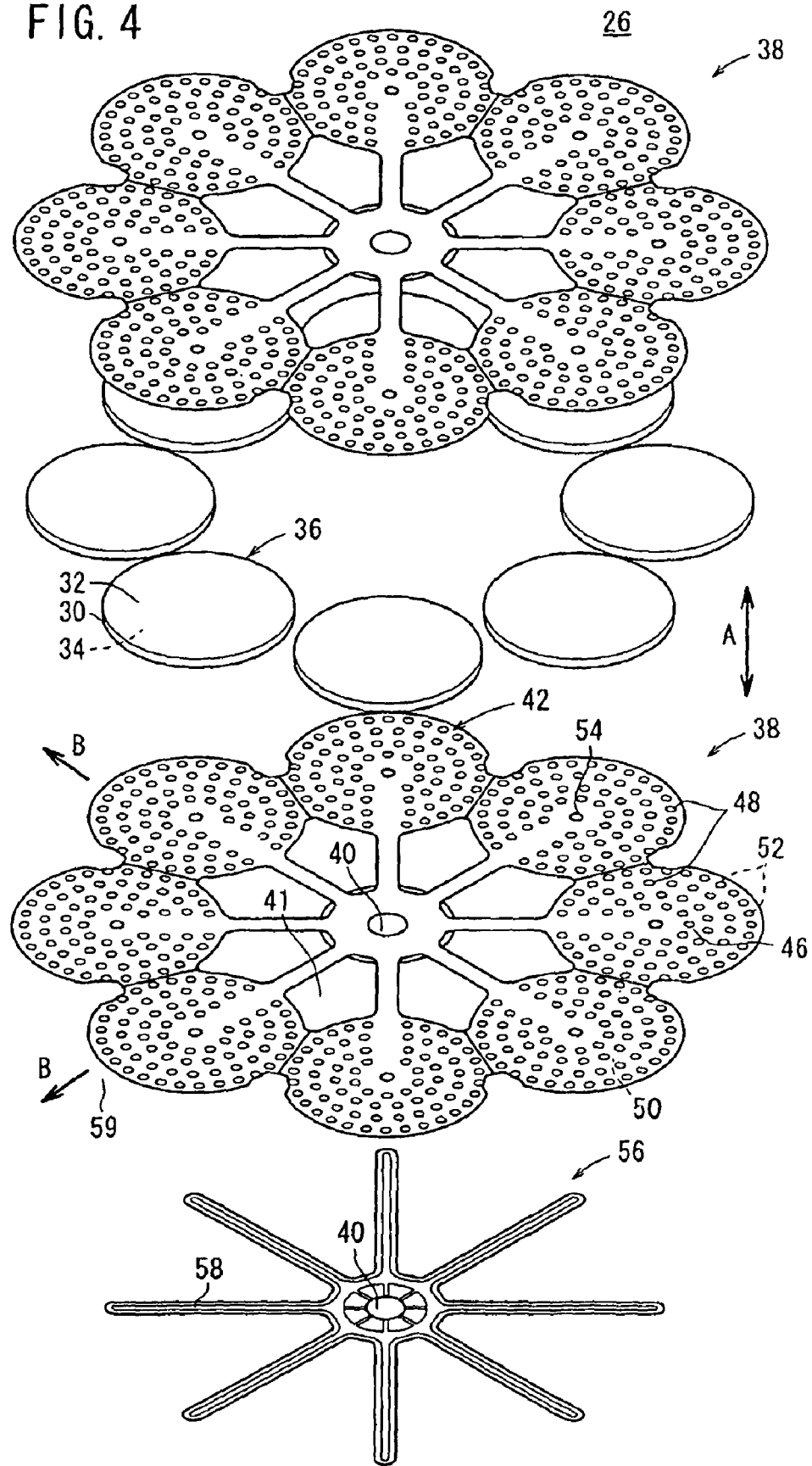
FIG. 4 is an exploded perspective view showing a fuel cell of the fuel cell stack.
Figure 5:
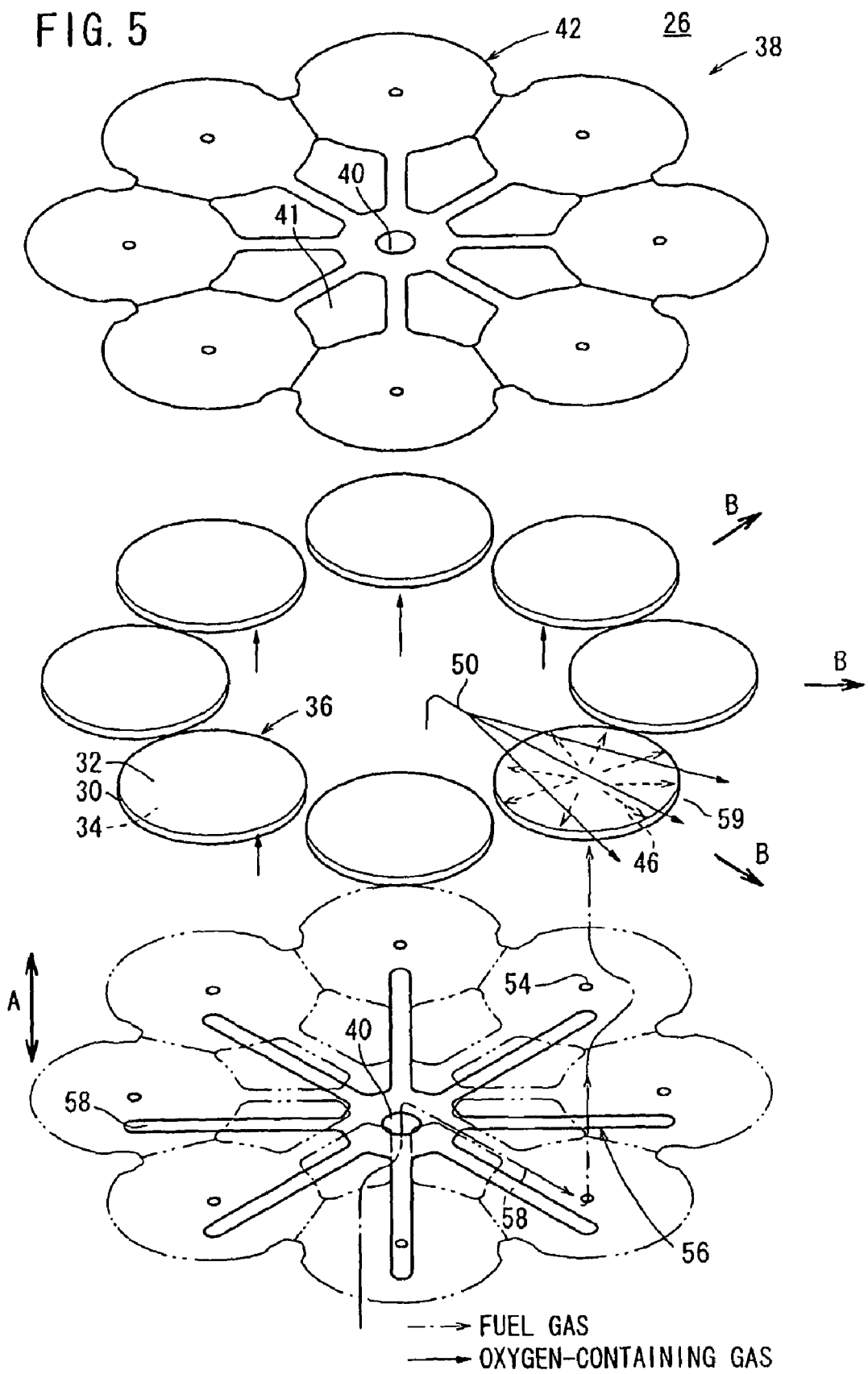
FIG. 5 is a partial exploded perspective view showing gas flows in the fuel cell.

The fuel cell 26 is a solid oxide fuel cell. As shown in FIGS. 4 and 5, the fuel cell 26 includes electrolyte electrode assemblies 36. Each of the electrolyte electrode assemblies 36 includes a cathode 32, an anode 34, and an electrolyte (electrolyte plate) 30 interposed between the cathode 32 and the anode 34. For example, the electrolyte 30 is made of ion-conductive oxide such as stabilized zirconia.

The operating temperature of the fuel cell 26 is high, about 700° C. or more. In the electrolyte electrode assembly 36, hydrogen is produced by reforming methane in the fuel gas, and the hydrogen is supplied to the anode 34.

A plurality of, e.g., eight electrolyte electrode assemblies 36 are sandwiched between a pair of separators 38 to form the fuel cell 26. The eight electrolyte electrode assemblies 36 are arranged in a circle concentric with a fuel gas supply passage 40 extending through the center of the separators 38. An oxygen-containing gas supply unit 41 is provided hermetically around the fuel gas supply passage 40.

In FIG. 4, for example, each of the separators 38 comprises a single metal plate of, e.g., stainless alloy or a carbon plate. The fuel gas supply passage 40 extends through the center of the separators 38. The separator 38 includes a plurality of circular disks 42. Each of the circular disks 42 has first protrusions 48 on its surface which contacts the anode 34. The first protrusions 48 form a fuel gas channel 46 for supplying the fuel gas along an electrode surface of the anode 34.

Each of the circular disks 42 has second protrusions 52 on its surface which contacts the cathode 32. The second protrusions 52 form an oxygen-containing gas channel 50 for supplying the oxygen-containing gas along an electrode surface of the cathode 32. As shown in FIGS. 4 and 5, each of the circular disks 42 has a fuel gas inlet 54 for supplying the fuel gas to the fuel gas channel 46.

A channel member 56 is fixed to the separator 38 by brazing or laser welding on a surface facing the cathode 32. The fuel gas supply passage 40 extends through the center of the channel member 56. The channel member 56 forms a fuel gas supply channel 58 connecting the fuel gas supply passage 40 and the fuel gas channel 46. An exhaust gas discharge channel 59 is formed around the separators 38 for discharging consumed reactant gases as an exhaust gas.

As shown in FIGS. 1 and 3, the fuel cell stack 12 includes a plurality of the fuel cells 26 stacked together, and end plates 60a, 60b provided at opposite ends in the stacking direction. A hole 61 is formed at the center of the end plate 60a, and holes 62 and screw holes 64 are formed alternately at predetermined angular intervals along the same virtual circle around the hole 61 (see FIG. 3). The holes 62 are connected to an air channel 84 as described later.

As shown in FIG. 1, the casing 16 includes a first case unit 66a containing the load applying mechanism 24 and a second case unit 66b containing the fuel cell stack 12. The end plate 60b and an insulating member (not shown) are sandwiched between the first case unit 66a and the second case unit 66b. The insulating member is provided on the side of the second case unit 66b. The joint portion between the first case unit 66a and the second case unit 66b is tightened by screws 68 and nuts 70.

The second case unit 66b is joined to one end of a cylindrical third case unit 72 as part of the fluid unit 14. A head plate 74 is fixed to the other end of the third case unit 72. An exhaust gas channel 76 is provided in the third case unit 72. The exhaust gas after consumption in the power generation discharged from the exhaust gas discharge channel 59 of the fuel cell stack 12 flows through the exhaust gas channel 76 in the fluid unit 14.

As shown in FIG. 2, the exhaust gas channel 76 includes a first channel 78 for supplying the exhaust gas to the reformer 22 as a heat source for reforming the mixed fuel, a second channel 80 for supplying the exhaust gas to the heat exchanger 18 as a heat source for heating the oxygen-containing gas, and a third channel 82 connected to the downstream side of the second channel 80 for supplying the exhaust gas to the evaporator 20 as a heat source for evaporating water. The second channel 80 is a main passage, and the first channel 78 is branched from the second channel 80 through a plurality of holes 81a formed in a wall 81. The first channel 78 is opened to the reformer 22 through a rectification hole (exhaust gas outlet) 83.

The reformer 22 and the evaporator 20 are arranged in the direction indicated by the arrow A1 such that the reformer 22 is positioned on the side of the fuel cell stack 12, and the evaporator 20 is positioned on the side away from the fuel cell stack 12. The heat exchanger 18 is provided outside the reformer 22. The distance between the heat exchanger 18 and the reformer 22, and the fuel cell stack 12 should be minimized. The exhaust gas discharge channel 59 of the fuel cell stack 12 is directly connected to the second channel 80 of the exhaust gas channel 76.

The second channel 80 is provided inside the heat exchanger 18. Further, an air channel 84 for the passage of the air is provided inside the heat exchanger 18, near the second channel 80. In the structure, the exhaust gas and the air heated by the exhaust gas flow in a counterflow manner. The air channel 84 is connected to the air supply pipe 86 at the head plate 74.

Figure 6:
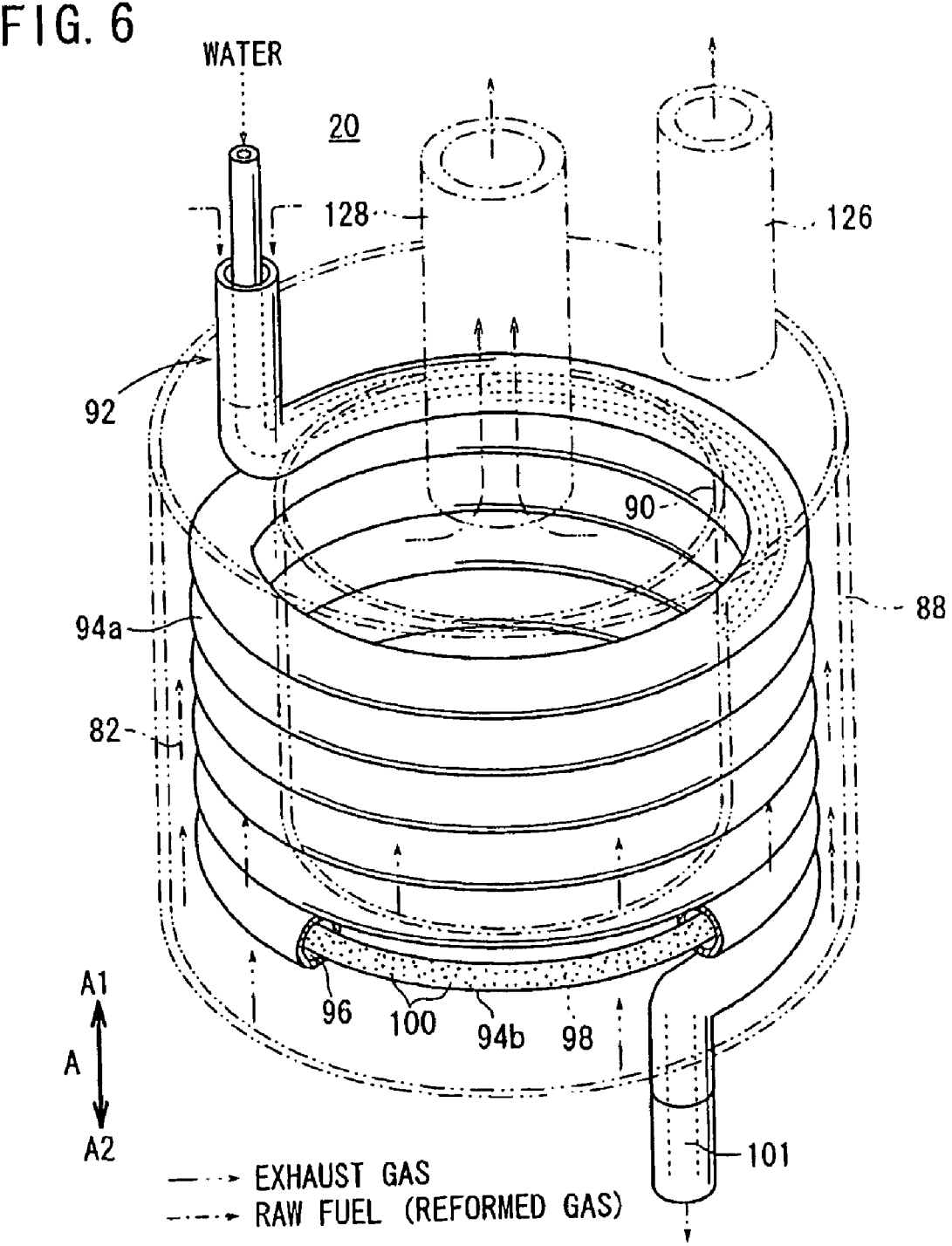
FIG. 6 is a perspective view showing main components of an evaporator of the fuel cell system.

The evaporator 20 has an outer cylindrical member 88 and an inner cylindrical member 90. The outer cylindrical member 88 and the inner cylindrical member 90 are coaxial with each other. A double pipe 92 is provided spirally between the outer cylindrical member 88 and the inner cylindrical member 90. As shown in FIGS. 2 and 6, the double pipe 92 includes an outer pipe 94a and an inner pipe 94b. The third channel 82 is formed between the outer pipe 94a, and the outer cylindrical member 88 and the inner cylindrical member 90.

A raw fuel channel 96 is formed between the outer pipe 94a and the inner pipe 94b. A water channel 98 is formed inside the inner pipe 94b. The inner pipe 94b has a plurality of holes 100 on the downstream side of the evaporator 20. For example, the diameter of the holes 100 is in the range of 10 μm to 100 μm.

An end of the double pipe 92 on the upstream side extends through the head plate 74 to the outside. At an end of the double pipe 92 on the downstream side, the inner pipe 94b is terminated, and only the outer pipe 94a extends in the direction indicated by the arrow A2. An end of a mixed fuel supply pipe 101 is connected to the outer pipe 94a, and the other end of the mixed fuel supply pipe 101 is connected to an inlet 102 of the reformer 22 (see FIG. 2). The mixed fuel supply pipe 101 extends toward the fuel cell stack 12, and is connected to the inlet 102. The inlet 102 is provided near the rectification hole 83 connected to the first channel 78 branched from the exhaust gas channel 76.

Figure 7:
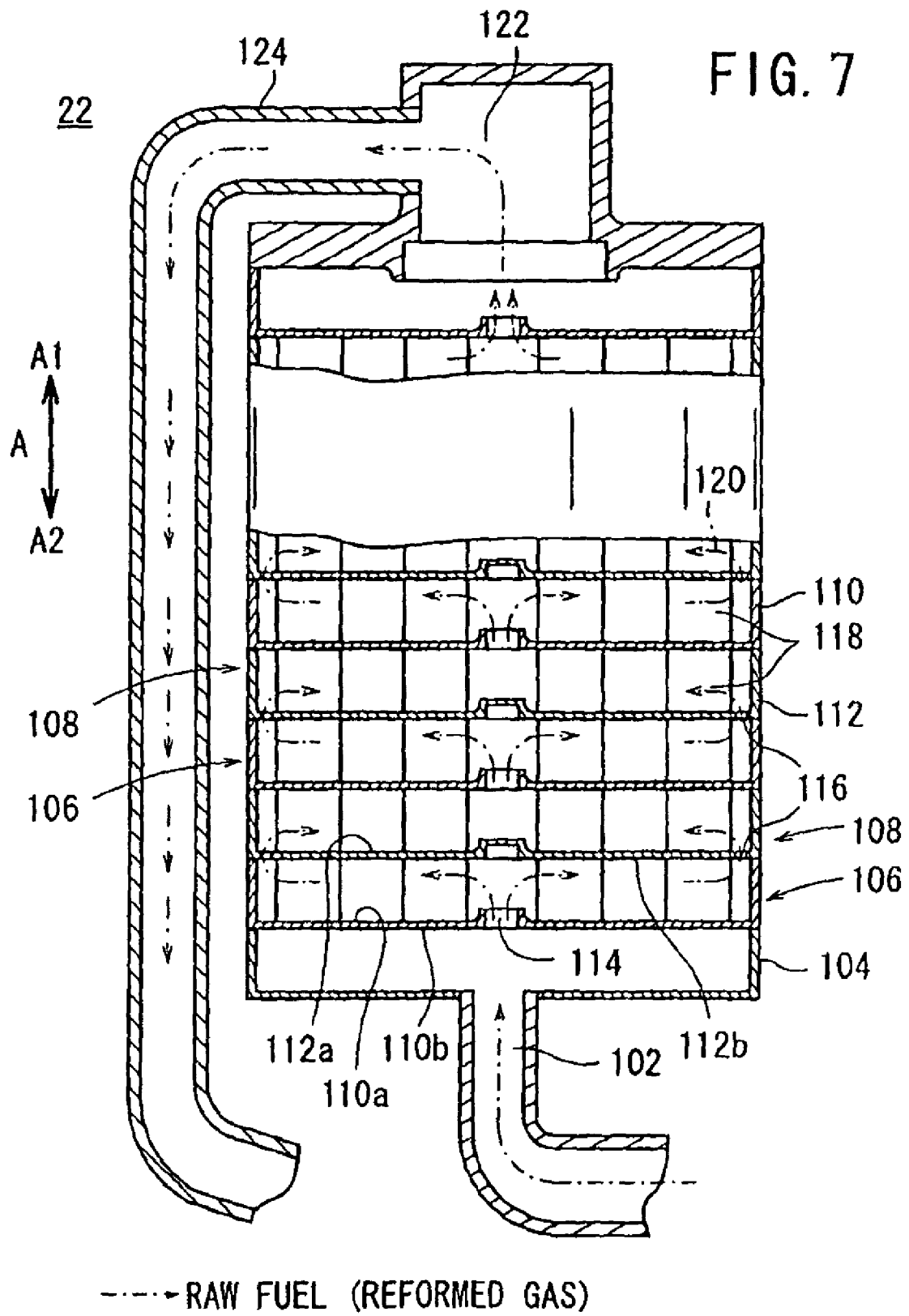
FIG. 7 is a partial cross sectional view showing the reformer.
Figure 8:
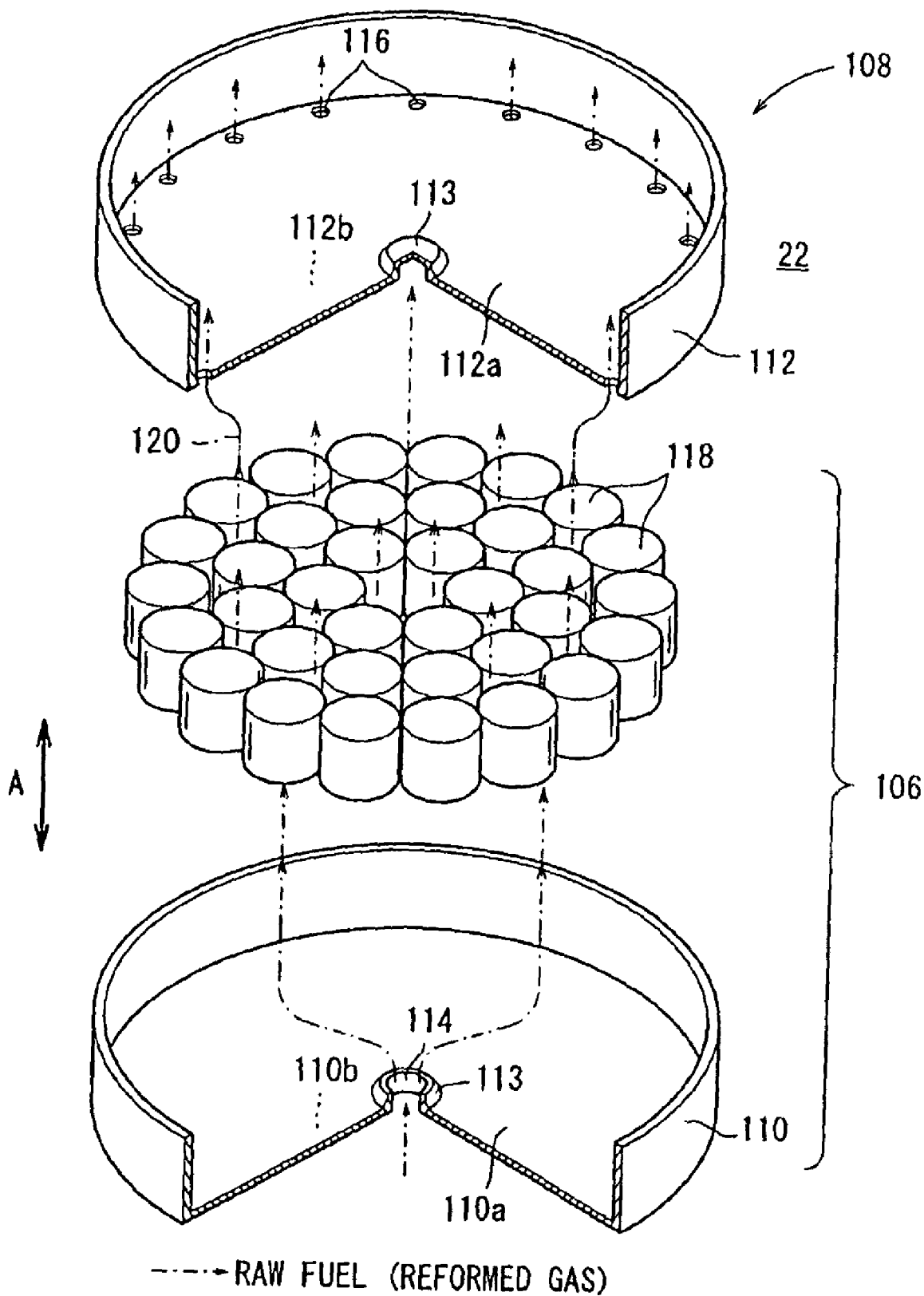
FIG. 8 is an exploded perspective view showing main components of the reformer.

As shown in FIG. 7, the reformer 22 has a lid 104, and the inlet 102 is formed at the lid 104. The lid 104 is positioned at an end of the reformer 22. The reformer 22 is formed by stacking first reforming units 106 and second reforming units 108 alternately, and coaxially, i.e., symmetrically with respect to the central axis of the first reforming units 106 and second reforming units 108. The first reforming units 106 and the second reforming units 108 include first and second receiver members 110, 112 each having a substantially plate shape. As shown in FIGS. 7 and 8, a first hole 114 is formed at a central expansion 113 of the first receiver member 110. A plurality of second holes 116 are formed in a circle along a peripheral portion of the second receiver member 112, concentrically with the central expansion 113.

In each of the reforming units 106, 108, a single layer of reforming catalyst pellets (reforming catalysts) 118 is sandwiched between the first and second receiver members 110, 112, substantially symmetrically with respect to the central axis of the first and second reforming units 106, 108. Each of the catalyst pellets 118 has a columnar shape. For example, the catalyst pellet 118 is formed by providing a nickel based catalyst on the base material of ceramics compound, e.g., aluminum oxide. The catalyst pellets 118 in the first reforming unit 106 are supported between an end of the first reforming unit 106 and an end of the second reforming unit 108 in the stacking direction.

Specifically, a single layer of catalyst pellets 118 is provided on each of an inner wall 110a of the first receiver member 110 and an inner wall 112a of the second receiver member 112. The catalyst pellets 118 in the first receiver member 110 substantially contact an outer wall 112b of the second receiver member 112 adjacent to the first receiver member 110, and the catalyst pellets 118 in the second receiver member 112 substantially contact an outer wall 110b of the first receiver member 110 adjacent to the second receiver member 112.

The expression "substantially contact" herein includes, e.g., the state in which the catalyst pellets 118 are supported between the first and second receiver members 110, 112 by the surface-to-surface contact or the point-to-point contact, and the state in which the catalyst pellets 118 are slightly spaced from the first or second receiver member 110, 112 due to the difference in the coefficient of thermal expansion or the like.

A reforming channel (raw fuel channel) 120 is formed in the reformer 22. The reforming channel 120 extends in the direction indicated by the arrow A1, and has a serpentine pattern going through the first holes 114 of the first receiver members 110 and the second holes 116 of the second receiver members 112. On the downstream side of the reformer 22 (at the end of the reformer 22 in the direction indicated by the arrow A1), an outlet 122 is provided, and an end of a reformed gas supply passage 124 is connected to the outlet 122 (see FIG. 7). As shown in FIG. 2, the reformed gas supply passage 124 extends along the axis of the reformer 22, into the hole 61 of the end plate 60a, and is connected to the fuel gas supply passage 40.

A main exhaust gas pipe 126 and an exhaust gas pipe 128 are connected to the head plate 74. The main exhaust gas pipe 126 is connected to the third channel 82 of the evaporator 20. The exhaust gas pipe 128 is provided at the center of the evaporator 20 for discharging the exhaust gas flowing around the reformer 22 in the direction indicated by the arrow A1.

A cylindrical cover 129 is provided around the outer cylindrical member 88 of the evaporator 20. A heat insulating layer 129a is formed in a closed space between the cylindrical cover 129 and the outer cylindrical member 88. The heat insulating layer 129a is connected to the second channel 80, and some of the exhaust gas is filled in the heat insulating layer 129a.

As shown in FIG. 1, the load applying mechanism 24 includes a first tightening unit 130a for applying a first tightening load T1 to a region around (near) the fuel gas supply passage 40 and a second tightening unit 130b for applying a second tightening load T2 to the electrolyte electrode assemblies 36. The second tightening load T2 is smaller than the first tightening load T1 (T1>T2).

As shown in FIGS. 1 and 3, the first tightening unit 130a includes short first tightening bolts 132a screwed into screw holes 64 formed along one diagonal line of the end plate 60a. The first tightening bolts 132a extend in the stacking direction of the fuel cells 26, and engage a first presser plate 134a. The first presser plate 134a is a narrow plate, and engages the central position of the separator 38 to cover the fuel gas supply passage 40.

The second tightening unit 130b includes long second tightening bolts 132b screwed into screw holes 64 formed along the other diagonal line of the end plate 60a. Ends of the second tightening bolts 132b extend through a second presser plate 134b having a curved outer section. Nuts 136 are fitted to the ends of the second tightening bolts 132b. Springs 138 and spring seats 140 are provided in respective circular portions of the second presser plate 134b at positions corresponding to the electrolyte electrode assemblies 36 on the circular disks 42 of the fuel cell 26. For example, the springs 138 are ceramics springs.

Operation of the fuel cell system 10 will be described below.

As shown in FIGS. 2 and 6, a raw fuel such as the city gas (including $CH_4$, $C_2H_6$, $C_3H_8$, and $C_4H_{10}$) is supplied to the raw fuel channel 96 of the double pipe 92 of the evaporator 20, and water is supplied to the water channel 98 of the double pipe 92. Further, an oxygen-containing gas such as the air is supplied to the air supply pipe 86.

In the evaporator 20, the raw fuel moves spirally along the raw fuel channel 96 in the double pipe 92, the water moves spirally along the water channel 98, and the exhaust gas as described later flows through the third channel 82. Thus, the water moving through the water channel 98 is evaporated, and gushes out from a plurality of holes 100 formed on the downstream side of the inner pipe 94b to the raw fuel channel 96.

At this time, the water vapor is mixed with the raw fuel flowing through the raw fuel channel 96, and the mixed fuel is obtained. The mixed fuel is supplied to the inlet 102 of the reformer 22 through the mixed fuel supply pipe 101 connected to the outer pipe 94a. As shown in FIG. 7, the mixed fuel supplied from the inlet 102 into the reformer 22 flows through the first hole 114 of the first receiver member 110. The mixed fuel is reformed by steam reforming with the catalyst pellets 118 interposed between the first and second receiver members 110, 112. Further, the mixed fuel is supplied to the next pellets 118 from the second holes 116 formed in the peripheral portion of the second receiver member 112.

Thus, the mixed fuel moving along the reforming channel 120 having the serpentine pattern in the reformer 22 is reformed by steam reforming. Thus, hydrocarbon of $C_{2+}$, is eliminated to produce a reformed gas (fuel gas) chiefly containing methane. The reformed gas flows through the reformed gas supply passage 124 connecting to the outlet 122 of the reformer 22. Then, the reformed gas is supplied to the fuel gas supply passage 40 of the fuel cell stack 12.

As shown in FIGS. 4 and 5, the fuel gas from the fuel gas supply passage 40 flows along the fuel gas supply channel 58. The fuel gas flows from the fuel gas inlet 54 of the circular disk 42 into the fuel gas channel 46. In each of the electrolyte electrode assemblies 36, the fuel gas inlet 54 is formed at substantially the central position of the anode 34. Therefore, the fuel gas is supplied from the fuel gas inlet 54 to the substantially center of the anode 34, and the methane in the fuel gas is reformed to produce a hydrogen gas. The fuel gas chiefly containing the hydrogen moves along the fuel gas channel 46 toward the outer region of the anode 34.

As shown in FIG. 2, when the air supplied from the air supply pipe 86 to the heat exchanger 18 moves along the air channel 84 of the heat exchanger 18, heat exchange is carried out between air and the burned exhaust gas as descried later flowing along the second channel 80. Thus, the air is heated to a predetermined temperature. As shown in FIGS. 4 and 5, the air heated in the heat exchanger 18 is supplied to the oxygen-containing gas supply unit 41 of the fuel cell stack 12, and flows into a space between the inner circumferential edge of the electrolyte electrode assembly 36 and the inner circumferential edge of the circular disk 42 in the direction indicated by the arrow B. Therefore, the air flows from the inner circumferential edge to the outer circumferential edge of the cathode 32 along the oxygen-containing gas channel 50.

Thus, in the electrolyte electrode assembly 36, the fuel gas flows along the anode 34, and the air flows along the cathode 32 for generating electricity by electrochemical reactions at the anode 34 and the cathode 32. The exhaust gas is discharged to the outside of each of the electrolyte electrode assemblies 36, and flows in the stacking direction along the exhaust gas discharge channel 59. Then, the exhaust gas flows into the exhaust gas channel 76.

The exhaust gas flowing through the exhaust gas channel 76 has the high temperature of about 700° C. As shown in FIG. 2, the exhaust gas partially flows into the first channel 78 branched through the hole 81a. The exhaust gas is supplied into the inlet 102 of the reformer 22 from the rectification hole 83 of the wall 81. After the exhaust gas locally heats the inlet 102 of the reformer 22, the exhaust gas flows inside the evaporator 20, and is discharged to the outside from the exhaust gas pipe 128.

At this time, steam reforming is performed in the reformer 22, and in particular, the temperature around the inlet 102 tends to be decreased. Therefore, by locally heating the inlet 102 by the hot exhaust gas, it is possible to limit the decrease in the temperature of the reformer 22. Thus, the temperature of the reformer 22 is stabilized. It is possible to maintain the S/C (steam/carbon) ratio at a certain level.

Further, the exhaust gas supplied to the second channel 80 of the exhaust gas channel 76 flows through the heat exchanger 18. Heat exchange between the exhaust gas and the air is performed. The air is heated to a predetermined temperature, and the temperature of the exhaust gas is decreased. Some of the exhaust gas is filled in the heat insulating layer 129a, and the remaining exhaust gas flows into the third channel 82 connected to the second channel 80. The third channel 82 is formed between the outer cylindrical member 88 and the inner cylindrical member 90 of the double pipe 92 of the evaporator 20. The exhaust gas evaporates the water flowing through the water channel 98 of the double pipe 92. Therefore, it is possible to reliably produce the mixed fuel of the raw fuel and the water vapor in the raw fuel channel 96. After the exhaust, gas flows through the evaporator 20, the exhaust gas is discharged to the outside through the main exhaust gas pipe 126.

In the first embodiment, as shown in FIGS. 7 and 8, the first reforming units 106 and the second reforming units 108 are stacked alternately in the reformer 22, and the reforming channel 120 is formed in the reformer 22. The reforming channel 120 has a serpentine pattern going through the first holes 114 of the first receiver members 110 and the second holes 116 of the second receiver members 112. The mixed fuel of the raw fuel and the water vapor flows along the reforming channel 120 in the serpentine pattern in the stacking direction. In the structure, since the length of the reforming channel 120 is long, it is possible to improve the efficiency in reforming the mixed fuel even if the reformer 22 has a compact structure as a whole.

Further, since the flow of the raw fuel and the water vapor is limited by the second holes 116 of the second reforming unit 108, the flow rate of the mixed fuel at the second holes 116 becomes constant. When the mixed fuel is supplied to the first reforming unit 106 at the constant flow rate, the flow rate of the mixed fuel in the first reforming unit 106 also becomes constant. Therefore, the mixed fuel is distributed uniformly to the catalyst pellets 118. Thus, the load of the catalyst reaction becomes uniform. Consequently, improvement in the reforming efficiency and the durability of the catalyst pellets 118 is achieved.

The single layer of catalyst pellets 118 provided in the first reforming unit 106 is supported by the end of the second reforming unit 108 adjacent to the first reforming unit 106, and the single layer of catalyst pellets 118 provided in the second reforming unit 108 is supported by the end of the first reforming unit 106 adjacent to the second reforming unit 108.

That is, the catalyst pellets 118 are supported between the adjacent first and second reforming units 106, 108. The mixed fuel contacts the catalyst pellets 118 suitably, and flows uniformly. Accordingly, the area of contact between the mixed fuel and the catalyst pellets 118 is increased effectively, and significant improvement in the reforming efficiency is achieved.

Further, in the first and second reforming units 106, 108, the catalyst pellets 118 contact the outer walls 110b, 112b of the first and second receiver members 110, 112 made of metal having good thermal conductivity. Heat is smoothly conducted to the catalyst pellets 118 through the outer walls 110b, 112b. Therefore, significant temperature differences (nonuniform temperature distribution) do not occur among the catalyst pellets 118 in the center and outer of the first and second reforming units 106, 108. Thus, even if steam reforming reaction is carried out, the heat is newly supplied swiftly for preventing nonuniform distribution of the reforming reaction. Accordingly, improvement in the reforming efficiency is achieved.

Further, the first and second reforming units 106, 108 are symmetrical with respect to the central axis, and the catalyst pellets 118 are provided substantially symmetrically with respect to the central axis. Accordingly, the temperature distribution in the first and second reforming units 106, 108 is substantially uniform. Significant heat stress or heat distortion is not generated, and improvement in the durability is achieved.

Figure 9:
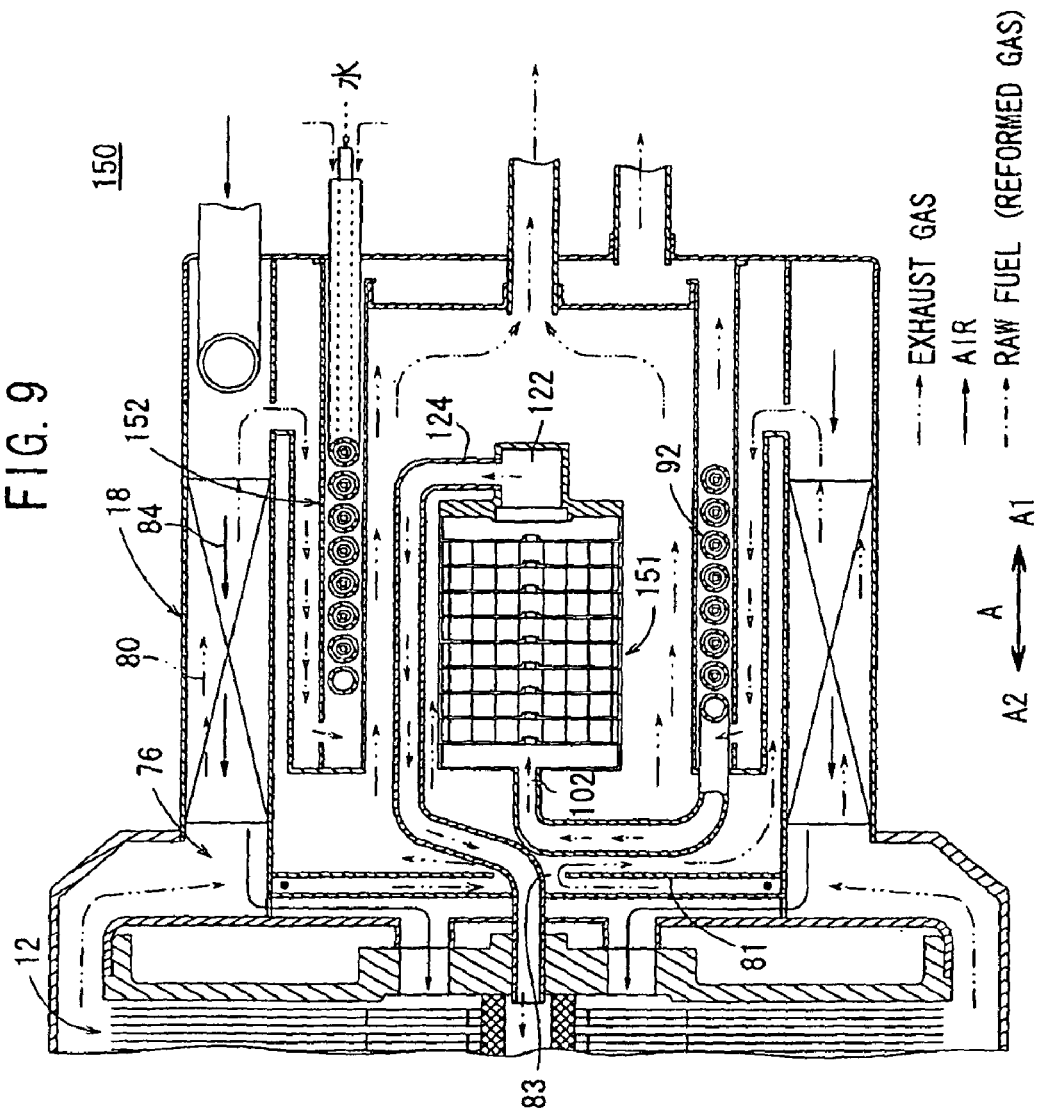
FIG. 9 is a cross sectional view showing main components of a fluid unit including a reformer according to a second embodiment of the present invention.

FIG. 9 is a cross sectional view showing main components of a fluid unit 150 including a reformer 151 according to a second embodiment of the present invention. The constituent elements that are identical to those of the fuel cell system 10 according to the first embodiment are labeled with the same reference numeral, and description thereof will be omitted. Likewise, in a third embodiment described later, description thereof will also be omitted.

A fluid unit 150 includes a heat exchanger 18, a reformer 151, and an evaporator 152. The fluid unit 150 is provided on one side of the fuel cell stack 12, symmetrically with respect to the central axis of the fuel cell stack 12. In the fluid unit 150, the evaporator 152 is provided outside the reformer 151, and the heat exchanger 18 is provided outside the evaporator 152.

In the second embodiment, the evaporator 152 and the reformer 151 are provided inside the heat exchanger 18. In the structure, it is possible to heat the reformer 151 by the heat radiated from the heat exchanger 18. Improvement in the heat insulation performance of the evaporator 152 is achieved effectively. It is possible to produce the water vapor easily. Further, the dimension of the fluid unit 150 in the direction indicated by the arrow A is reduced effectively. Accordingly, reduction in the overall size of the fuel cell system is achieved easily.

Figure 10:
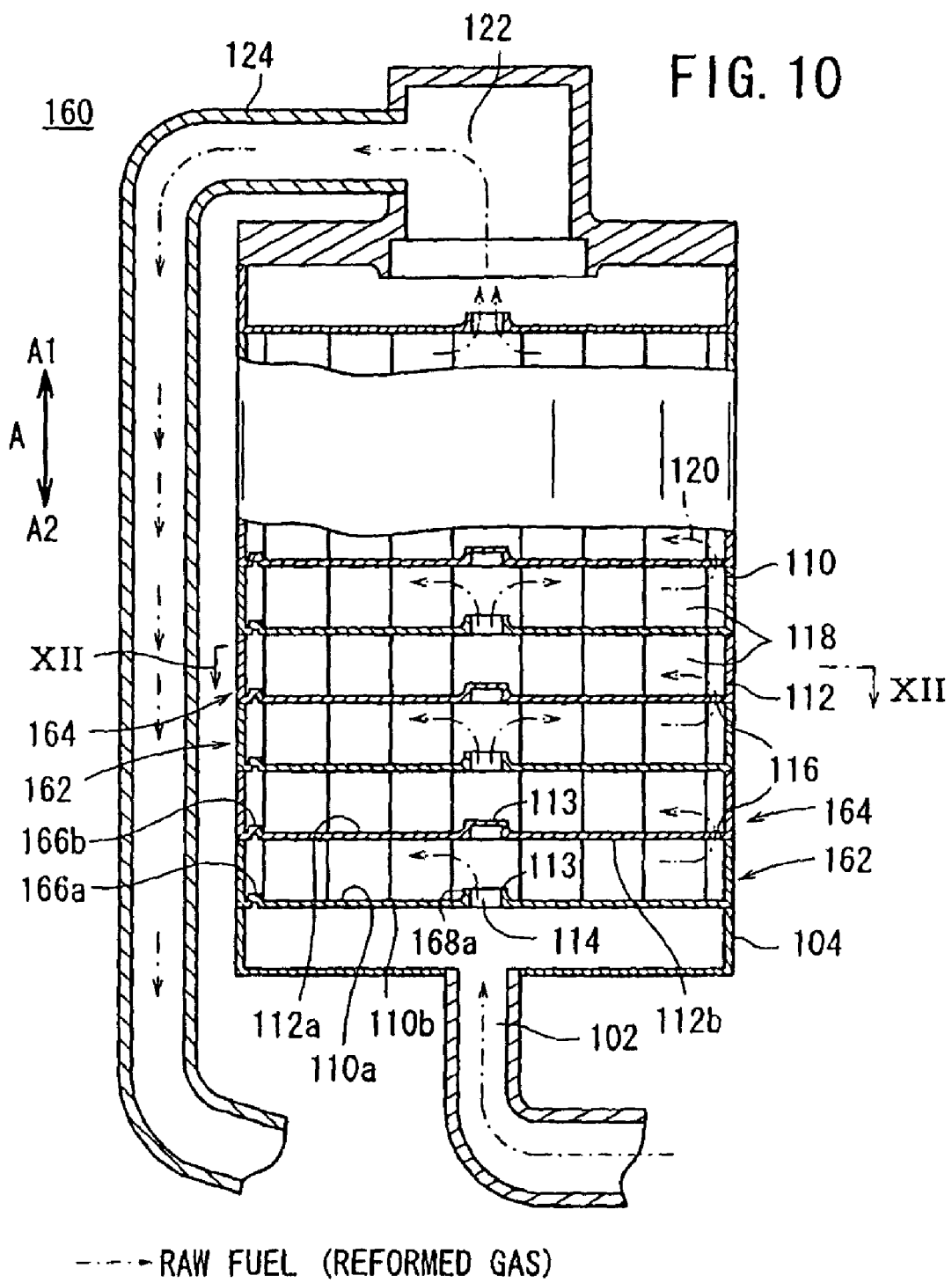
FIG. 10 is a partial cross sectional view showing a reformer according to a third embodiment of the present invention.
Figure 11:
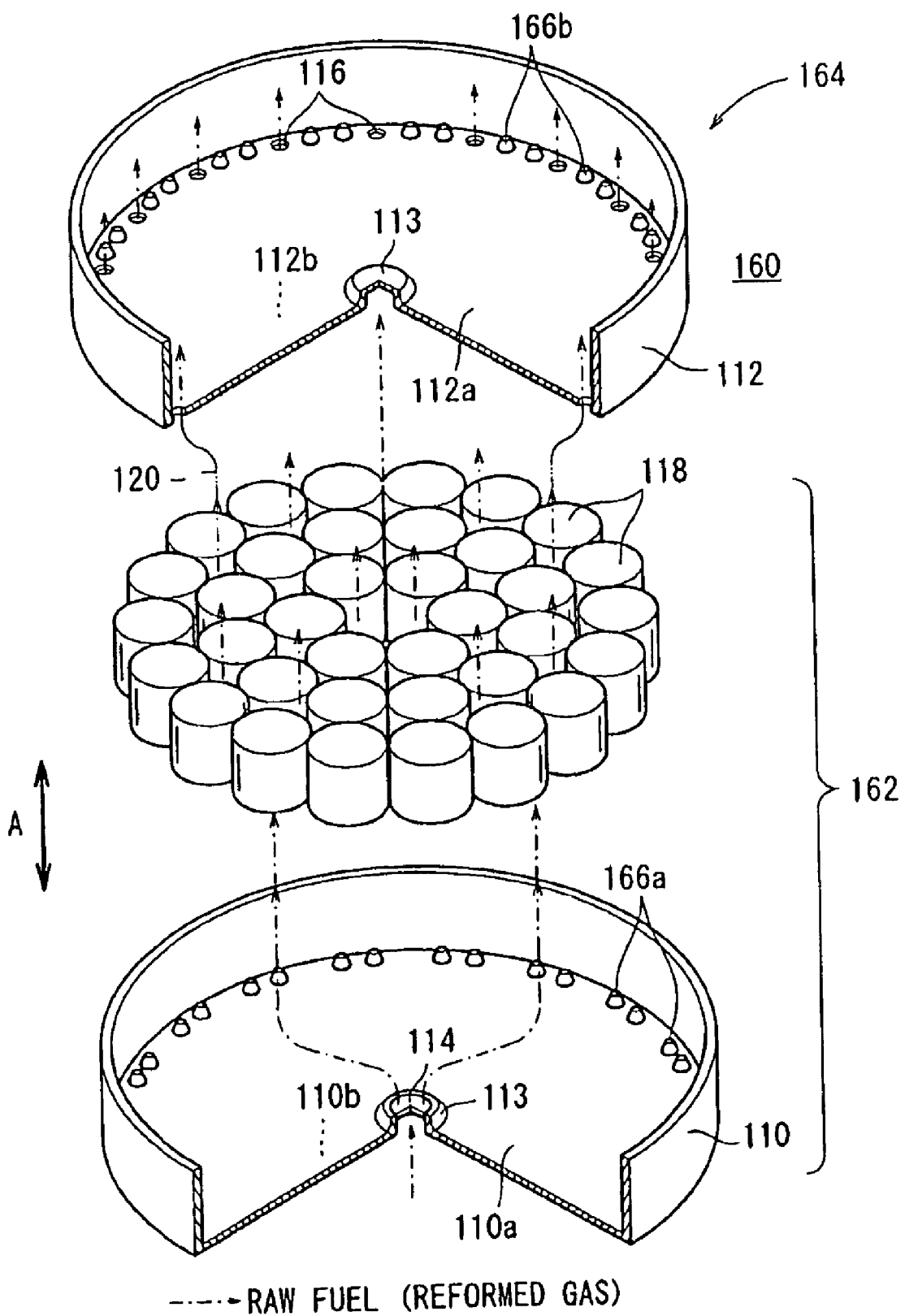
FIG. 11 is an exploded perspective view showing main components of the reformer.

FIG. 10 is a partial cross sectional view showing a reformer 160 according to the third embodiment of the present invention. FIG. 11 is an exploded perspective view showing main components of the reformer 160.

Figure 12:
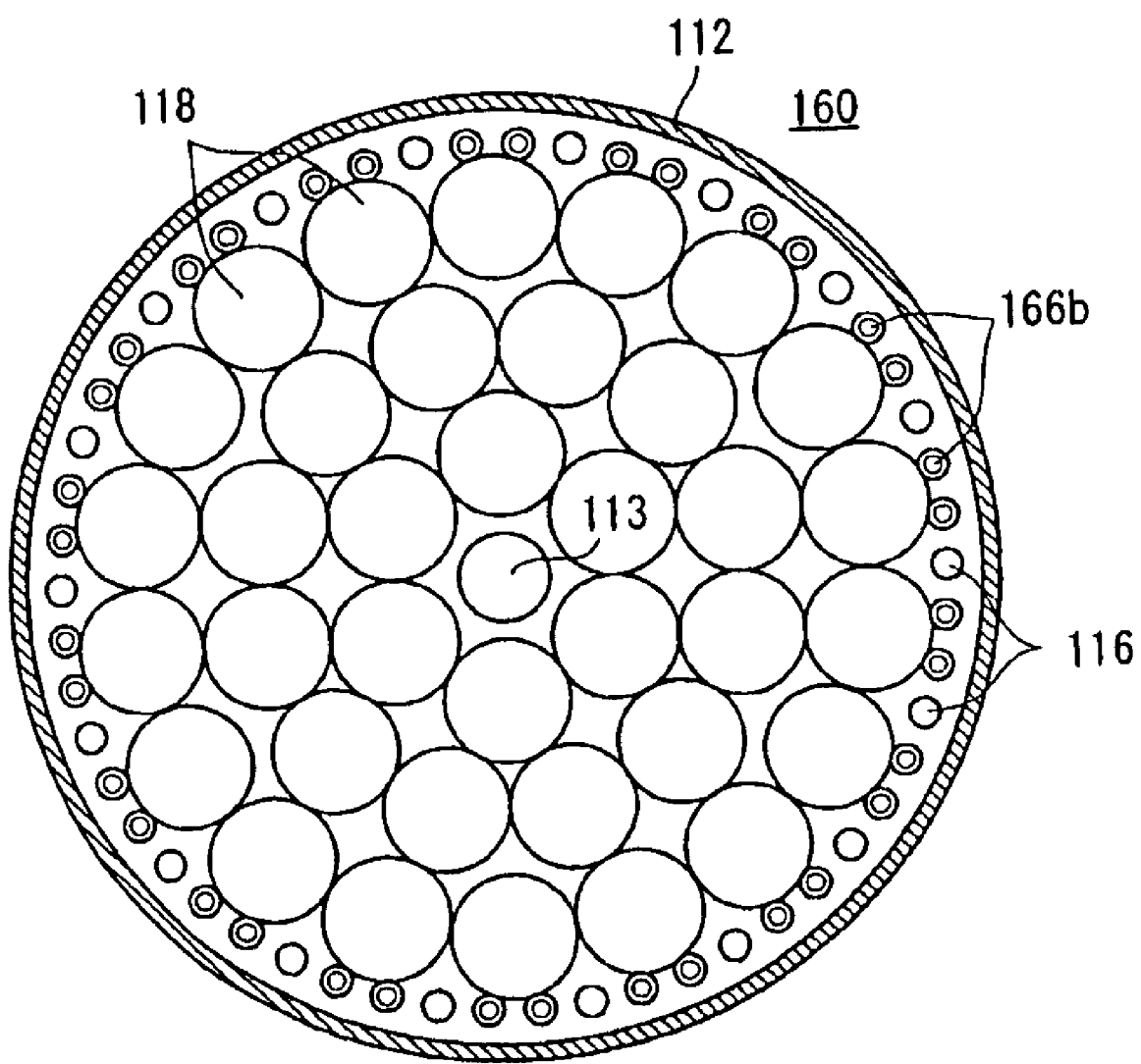
FIG. 12 is a cross sectional view showing the reformer taken along a line XII-XII in FIG. 10.
Figure 13:
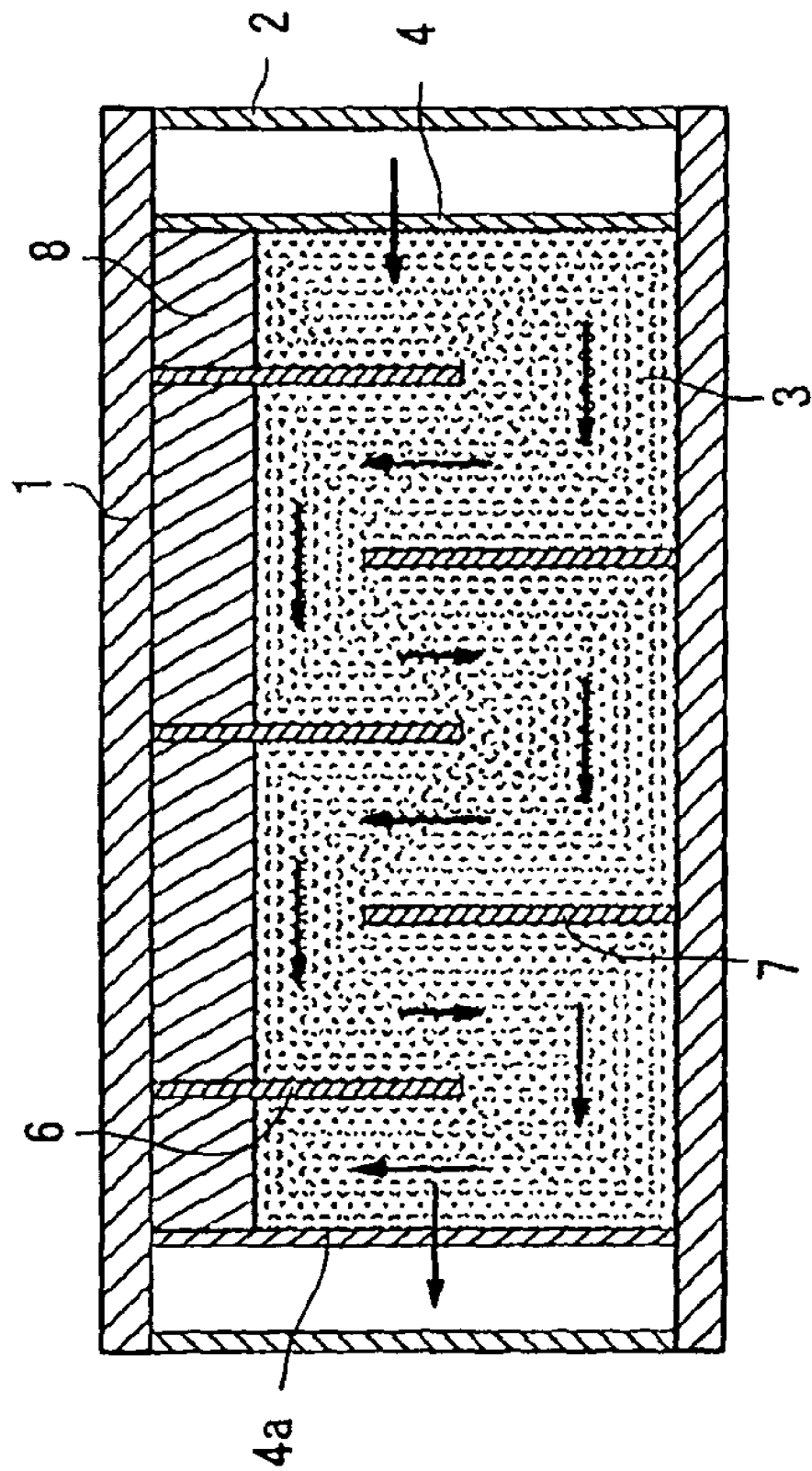
FIG. 13 is a cross sectional view showing a conventional reformer.

The reformer 160 is formed by stacking first reforming units 162 and second reforming units 164. The first reforming units 162 and the second reforming units 164 have first receiver members 110 and second receiver members 112 respectively. A plurality of positioning protrusions 166a protrude from an inner wall 110a of the first receiver member 110 upwardly, and a plurality of positioning protrusions 166b protrude from an inner wall 112a of the second receiver member 112 upwardly. The protrusions 166a and the protrusions 166b are provided along the same circle concentrically with a central expansion 113. Two protrusions are provided between the second holes 116 to engage the outermost catalyst pellet 118 of the single layer of catalyst pellets 118 (see FIGS. 10 and 12).

In the third embodiment, in the first reforming unit 162, the catalyst pellets 118 are positioned between the central expansion 113 forming the first hole 114 and the protrusions 166a. In the second reforming unit 164, the catalyst pellets 118 are positioned between the central expansion 113 and the protrusions 166b. Further, both end surfaces of the catalyst pellets 118 substantially contact the first and second receiver members 110, 112.

In the structure, the catalyst pellets 118 are desirably arranged, and reliably held in the first and second reforming units 162, 164. The mixed fuel contacts the circumferential surfaces of the catalyst pellets 118, and flows uniformly.

Thus, the same advantages as in the case of the first embodiment can be obtained. For example, improvement in the reforming efficiency is achieved effectively.

INDUSTRIAL APPLICABILITY

According to the present invention, the raw fuel channel is formed in the reforming units for allowing the raw fuel to flow in the serpentine pattern in the stacking direction of the reforming units. Therefore, the length of the raw fuel channel is increased effectively. Accordingly, improvement in the reforming efficiency is achieved even if the reforming units have a compact structure.

The single layer of the reforming catalysts is supported between the end of one of the adjacent reforming units and the end of the other of the adjacent reforming units. Therefore, the reforming catalysts are suitably supported between the adjacent reforming units. The raw fuel flows uniformly, and reliably contacts the reforming catalysts. Further, the reforming catalysts contact the ends of the reforming units, and thus, heat is smoothly conducted to the reforming catalysts. As a result, significant temperature differences (nonuniform temperature distribution) do not occur among the reforming catalysts provided in the center and outer of the reforming units. Nonuniform distribution of the reforming reaction does not occur. Accordingly, improvement in the reforming efficiency is achieved.

Further, since the raw fuel flow uniformly, the temperature distribution in the reforming catalysts is substantially uniform. Therefore, it is not necessary to specially determine the S/C (steam/carbon) ratio for the portion having the high temperature. Thus, it is possible to use a small value for the S/C ratio of the reforming unit. Accordingly, the amount of water vapor is reduced effectively, and improvement in the reforming efficiency is achieved.

The invention claimed is:

1. A reformer for reforming a raw fuel containing hydrocarbon to produce a reformed gas, said reformer comprising a plurality of reforming units which are stacked together, wherein a raw fuel channel is provided in said reforming units for allowing the raw fuel to flow in a serpentine pattern in a stacking direction of said reforming units;

a plurality of reforming catalysts arranged in a single layer are provided in each of said reforming units, and said plurality of reforming catalysts are supported between an end of one of the plurality of reforming units and an end of an adjacent one of the plurality of reforming units in the stacking direction;

the one reforming unit has a first receiver member, said first receiver member having a first hole formed at substantially the center of said first receiver member;

the adjacent reforming unit has a second receiver member, said second receiver member having a plurality of second holes formed in a peripheral portion of said second receiver member; and said raw fuel channel goes through said first hole and said second holes alternately to have a serpentine pattern.

2. A reformer according to claim 1, wherein each of said reforming catalysts has a columnar shape, and both end surfaces of each of said reforming catalysts substantially contact a wall surface of said first receiver member and a wall surface of said second receiver member.

3. A reformer according to claim 1, wherein a central expansion is provided at substantially the center of the one reforming unit for forming said first hole.

4. A reformer according to claim 1, wherein said second holes are formed along the same circle concentrically with said first hole.

5. A reformer according to claim 1, wherein said reforming units are symmetrical with respect to the central axis of said reforming units; and
   said reforming catalysts are provided substantially symmetrically with respect to the central axis of said reforming units.

6. A reformer according to claim 1, wherein at least one protrusion for positioning said reforming catalysts in the single layer is provided in said reforming units.

7. A reformer according to claim 6, wherein a plurality of said protrusions are provided along the same circle concentrically with said first hole.

* * * * *